US012712724B1

(12) United States Patent
Austin et al.

(10) Patent No.: US 12,712,724 B1
(45) Date of Patent: Aug. 18, 2026

(54) SYSTEMS FOR OBFUSCATION AND MANIPULATION OF STRINGS FOR DIGITAL ASSET PROTECTION

(71) Applicant: VoiceIt Technologies, Inc., Eden Prairie, MN (US)

(72) Inventors: William Austin, Herndon, VA (US); Eric J. Mencke, Fairfax, VA (US); Noel J. Grover, Chanhassen, MN (US)

(73) Assignee: VoiceIt Technologies, Inc., Eden Prairie, MN (US)

(*) Notice: Subject to any disclaimer, the term of this patent is extended or adjusted under 35 U.S.C. 154(b) by 29 days.

(21) Appl. No.: 19/043,321

(22) Filed: Jan. 31, 2025

Related U.S. Application Data

(60) Provisional application No. 63/752,451, filed on Jan. 31, 2025, provisional application No. 63/731,734, filed on Oct. 23, 2024, provisional application No. 63/627,664, filed on Jan. 31, 2024, provisional application No. 63/627,306, filed on Jan. 31, 2024.

(51) Int. Cl.
*H04L 29/06* (2006.01)
*H04L 9/08* (2006.01)
*H04L 9/40* (2022.01)

(52) U.S. Cl.
CPC ........ *H04L 9/0869* (2013.01); *H04L 63/0428* (2013.01)

(58) Field of Classification Search
None
See application file for complete search history.

(56) References Cited

U.S. PATENT DOCUMENTS 7,779,270 B2 * 8/2010 Horning ................ G06F 21/125 713/189
8,468,244 B2 6/2013 Redlich et al.
8,473,754 B2 6/2013 Jones et al.
8,782,436 B2 7/2014 Koifman et al.
8,819,309 B1 8/2014 Bruce et al.
9,419,796 B2 8/2016 Konig
9,575,903 B2 2/2017 Glew et al.
9,634,836 B1 4/2017 Butzer (Continued)

FOREIGN PATENT DOCUMENTS

CN 114218597 A 3/2022
CN 114978496 A 8/2022
CN 116366232 A 6/2023

OTHER PUBLICATIONS

Ren, Shu Qin et al. Privacy-Preserved Multi-Party Data Merging with Secure Equality Evaluation. 2016 International Conference on Cloud Computing Research and Innovations (ICCCRI). https://ieeexplore.ieee.org/stamp/stamp.jsp?tp=&arnumber=7600175 (Year: 2016).*

(Continued)

*Primary Examiner* — Jeremiah L Avery
(74) *Attorney, Agent, or Firm* — Barnes & Thornburg LLP

(57) ABSTRACT

Obfuscation techniques are provided for generating data such that the data remains private, data tampering is prevented, and reverse engineering is deterred. One such technique is a Stealthy String technique in which special meaning is encoded into seemingly random strings. Another such technique is a Blended String technique in which multiple strings are merged in a randomly parameterized manner.

19 Claims, 3 Drawing Sheets

(56) References Cited

U.S. PATENT DOCUMENTS

| | | | | |
|---|---|---|---|---|
| 9,767,306 | B2 | 9/2017 | Klum | |
| 9,785,801 | B2 | 10/2017 | Zimmer et al. | |
| 9,887,834 | B1 | 2/2018 | Molaro | |
| 9,934,400 | B2 | 4/2018 | Gilbert | |
| 9,996,479 | B2 | 6/2018 | Lea | |
| 10,057,269 | B1 | 8/2018 | Ellingson | |
| 10,103,886 | B1 | 10/2018 | Gutoski et al. | |
| 10,122,699 | B1 | 11/2018 | Ellingson et al. | |
| 10,291,393 | B1 | 5/2019 | Molaro et al. | |
| 10,360,395 | B2 | 7/2019 | Fiske | |
| 10,476,664 | B2 | 11/2019 | Kuang | |
| 10,691,837 | B1 | 6/2020 | Martel et al. | |
| 10,735,137 | B2 | 8/2020 | Yanovsky et al. | |
| 10,860,744 | B2 | 12/2020 | Norem | |
| 10,860,745 | B2 | 12/2020 | Perone et al. | |
| 10,873,458 | B2 | 12/2020 | Reinhold | |
| 10,992,453 | B2 | 4/2021 | Geagan et al. | |
| 11,057,193 | B2 | 7/2021 | Kuang et al. | |
| 11,243,893 | B2 | 2/2022 | Lutz et al. | |
| 11,256,477 | B2 | 2/2022 | Brandao et al. | |
| 11,281,660 | B1 | 3/2022 | Pike et al. | |
| 11,281,790 | B2 | 3/2022 | Chung | |
| 11,297,166 | B2 | 4/2022 | Lapushkin et al. | |
| 11,323,247 | B2 | 5/2022 | Kuang | |
| 11,483,140 | B2 | 10/2022 | Prisco et al. | |
| 11,516,201 | B2 | 11/2022 | Wu et al. | |
| 11,550,883 | B2 | 1/2023 | Meily | |
| 11,641,347 | B2 | 5/2023 | Kuang et al. | |
| 11,750,394 | B2 | 9/2023 | Firestone et al. | |
| 11,777,724 | B2 | 10/2023 | Low et al. | |
| 11,936,778 | B2 | 3/2024 | Krauthammer et al. | |
| 11,979,394 | B2 | 5/2024 | Arneson et al. | |
| 11,991,275 | B2 | 5/2024 | Newton et al. | |
| 11,997,200 | B2 | 5/2024 | Mandich et al. | |
| 12,072,994 | B2 | 8/2024 | Chung | |
| 12,093,231 | B1 * | 9/2024 | Kondiles | G06F 16/219 |
| 12,174,971 | B1 | 12/2024 | Kovac | |
| 12,238,202 | B2 | 2/2025 | Pecen et al. | |
| 2014/0304505 | A1 * | 10/2014 | Dawson | G06F 21/6227 713/165 |
| 2016/0219024 | A1 * | 7/2016 | Verzun | H04L 9/34 |
| 2017/0012949 | A1 | 1/2017 | Boren et al. | |
| 2017/0093811 | A1 * | 3/2017 | Dolev | H04L 45/1287 |
| 2019/0004768 | A1 * | 1/2019 | Li | G06F 7/24 |
| 2019/0363877 | A1 * | 11/2019 | Figueira | H04L 9/0869 |
| 2020/0117810 | A1 | 4/2020 | Kouvanis et al. | |
| 2020/0159888 | A1 | 5/2020 | Ghose | |
| 2020/0195446 | A1 | 6/2020 | Lepoint et al. | |
| 2020/0328886 | A1 * | 10/2020 | Newton | H04L 9/0819 |
| 2021/0152347 | A1 | 5/2021 | Cambou | |
| 2021/0152532 | A1 * | 5/2021 | Reinhold | H04L 9/0643 |
| 2021/0234682 | A1 | 7/2021 | Lane et al. | |
| 2021/0279341 | A1 * | 9/2021 | Huck | H04L 9/0656 |
| 2022/0103533 | A1 | 3/2022 | Srinivasan | |
| 2022/0215948 | A1 * | 7/2022 | Bardot | G16H 40/40 |
| 2023/0267054 | A1 | 8/2023 | McAuliffe et al. | |
| 2023/0274023 | A1 | 8/2023 | Yoon | |
| 2023/0281292 | A1 * | 9/2023 | Wu | G06F 21/44 713/189 |
| 2023/0291545 | A1 | 9/2023 | Cap et al. | |
| 2023/0291555 | A1 | 9/2023 | Berta et al. | |
| 2023/0308267 | A1 | 9/2023 | Futami | |
| 2024/0303042 | A1 | 9/2024 | Nakamura | |
| 2025/0047476 | A1 | 2/2025 | Krauthammer et al. | |

OTHER PUBLICATIONS

Ahn, Jung-Sang et al. ForestDB: a Fast Key-Value Storage System for Variable-Length String Keys. IEEE Transactions on Computers, vol. 65, Issue: 3. https://ieeexplore.ieee.org/stamp/stamp.jsp?tp=&arnumber=7110563 (Year: 2016).*

Campbell, D. R.; Diffie, D. W.; Robinson, C. Advancements in Quantum Computing and AI May Impact PQC Migration Timelines. Preprints 2024, 2024021299. (Feb. 22, 2024), 12 pages.

Celesti, A., "Adding long-term availability, obfuscation, and encryption to multi-cloud storage systems" Science Direct, vol. 59 (Jan. 2016), p. 208-218.

Chen, L., Jordan, S., Liu, Y., Peralta, R., Perlner, R., Smith-Tone, D., Report on Post-Quantum Cryptography Standards, NIST Internal Report, NIST IR 8105 ipd (Apr. 21, 2016). 15 pages.

Daemen et al., The Design of Rijndael: AES—The Advanced Encryption Standard, New York: Springer, 2002, Preface and Table of Contents, 16 pages.

International Search Report and Written Opinion in PCT/US2025/014221 dated May 22, 2025, 12 pages.

National Institute of Standards and Technology, "Cryptographic Standards and Guidelines", Dec. 18, 2021, accessed at https://csrc.nist.gov/projects/cryptographic-standards-and-guidelines/archived-crypto-projects/aes-development on Aug. 8, 2025, 5 pages.

National Institute of Standards and Technology, "Module-Lattice-Based Digital Signature Standard", FIPS 204, Aug. 13, 2024, 65 pages.

National Institute of Standards and Technology, "Module-Lattice-Based Key-Encapsulation Mechanism Standard", FIPS 203, Aug. 13, 2024, 56 pages.

National Institute of Standards and Technology, "Stateless Hash-Based Digital Signature Standard", FIPS 205, Aug. 13, 2024, 61 pages.

National Institute of Standards and Technology, Submission Requirements and Evaluation Criteria for the Post-Quantum Cryptography Standardization Process, NIST Call for Proposals (Dec. 2016). Section 4. 25 pages.

Quantinuum, "Quantum Origin" Technical White Paper, 2024, 12 pages.

Wikipedia, "Transmission Control Protocol," accessed at https://en.wikipedia.org/wiki/Transmission_Control_Protocol on Aug. 8, 2025, 17 pages.

Yakobu, et al., "An Enhanced Secure, Robust and Efficient Crypto Scheme for Ensuring Data Privacy in Public Cloud Using Obfuscation & Encryption," Journal homepage: http://iieta. org/ journals/isi. Dec. 2019;24(6):603-9.

Underhill et al., "Towards post-quantum symmetric cryptography", accessed at https://eprint.iacr.org/2019/553.pdf on Aug. 8, 2025, 10 pages.

* cited by examiner

SYSTEMS FOR OBFUSCATION AND MANIPULATION OF STRINGS FOR DIGITAL ASSET PROTECTION

REFERENCE TO RELATED APPLICATIONS

This application claims the benefit of:

U.S. Provisional Application Ser. No. 63/627,306 (filed Jan. 31, 2024),

U.S. Provisional Application Ser. No. 63,627,664 (filed Jan. 31, 2024),

U.S. Provisional Application Ser. No. 63/731,734 (filed Oct. 23, 2024), and

U.S. Provisional Application Ser. No. 63/752,451 (filed Jan. 31, 2025).

The disclosure of the prior applications is considered part of, and is incorporated by reference in, the disclosure of this application.

TECHNICAL FIELD

The present disclosure relates generally to protecting data at rest and/or in transit. More particularly, the present disclosure relates to providing quantum cyber resilience protection of digital assets to be stored at cold rest or in array storage in non-volatile memory of a computer system and/or communicated over a secure or unsecure network from tampering and/or decrypting including quantum computer cryptographic attacks.

BACKGROUND

In modern computer and information technology (IT) systems, numerous cryptographic standards and techniques have been developed for digital information (data and/or code) that employ digital encryption, signatures, and authentication to secure and protect this information. See, Schneier, B., *Applied Cryptography* (1993); Wong, D., *Real World Cryptography*, (2021).

Various cryptographic solutions have been developed to obfuscate meta data in the form of strings. Strings are traditionally a sequence of characters used as a literal constant or a variable in a computer program. See, "String (computer science)" available at en.wikipedia.org/wiki/String_(computer_science). Examples of various kind of obfuscations approaches are shown, for example, in the Obfuscate library for embedded literal strings in C++ 14 programs, available at github.com/adamyaxley/Obfuscate, and as described, for example, in U.S. Pat. No. 10,021,085.

SUMMARY OF THE DISCLOSURE

Embodiments of the present disclosure provide computer-implemented digital asset protection systems configured to obfuscate and manipulate strings of meta-data and related variables and values used in securing digital assets so that they can be quantum cyber resilient at rest or data in transit.

Embodiments of the present disclosure may be used to provide string manipulation features in various embodiments of computer-implemented digital asset protection systems configured to generate packages of digital assets that are quantum cyber resilient for data-in-transit and/or data-at-rest.

In some implementations, a method for merging strings of data in a randomly parameterized manner includes: receiving, by a computing device, a first string and a second string; calculating, by the computing device, a compressed string length, based on a length of the first string, a length of the second string, or lengths of the first and second strings; calculating, by the computing device, a shuffle key length; generating, by the computing device, a shuffle key having a number of bytes that corresponds to the calculated shuffle key length, wherein generating the shuffle key comprises an application of a random function, and wherein the shuffle key is a bit pattern that comprises a randomized series of zero-bits and one-bits; calculating, by the computing device, a first chunk size for the first string; calculating, by the computing device, a second chunk size for the second string; sequentially traversing the shuffle key, by the computing device, to determine a series of shuffle key bits; for each shuffle key bit in the series of shuffle key bits, (i) in response to the shuffle key bit being a zero-bit, adding a next chunk of the first string having the first chunk size to a merged string, or (ii) in response to the shuffle key bit being a one-bit, adding a next chunk of the second string having the second chunk size to the merged string; generating, by the computing device, a header that comprises the compressed string length, the shuffle key length, and the shuffle key; and transmitting, by the computing device to another computing device, the merged string and the header.

This and other implementations can include any, all, or none of the following features. The first string can include at least one of a directory name, a file name, an encryption key, and a signature, and the second string can include randomly generated noise. An obfuscation process can be performed on the first string. An obfuscation process can be performed on the merged string. Calculating the shuffle key length can include: determining, from the first string and the second string, a string having a lesser string length; determining a lesser key length value by doubling the lesser string length; and selecting as the shuffle key length, the lesser key length value. A shuffle complexity value can be received. Calculating the shuffle key length can include: determining a recommended shuffle key length value by multiplying the shuffle complexity value by a predetermined shuffle size constant; comparing the recommended shuffle key length value to the lesser key length value, and selecting as the shuffle key length, a lesser of the recommended shuffle key length value and the lesser key length value. Calculating the first chunk size for the first string can include dividing a length of the first string by a number of zero-bits in the shuffle key. Calculating the second chunk size for the second string can include dividing a length of the second string by a number of one-bits in the shuffle key. The merged string and the header can be concatenated. Providing the merged string and the header can include providing the merged string and the header together. Providing the merged string and the header can include providing the merged string and the header separately. The shuffle key length and the compressed key length can be stored in a fixed length portion of the header, and the shuffle key can be stored in a variable length portion of the header. The merged string and the header can be received, and the first string and the second string can be unmerged. Unmerging the first string and the second string can include: unpacking the header to determine the compressed string length, the shuffle key length, and the shuffle key; based on the compressed string length, calculating the length of the first string and the length of the second string; based on the length of the first string, calculating the first chunk size for the first string; based on the length of the second string, calculating the second chunk size for the second string; and extracting the first string and the second string from the merged string using the shuffle key.

In some implementations, a method for encoding data values into random strings of data includes: receiving, by a computing device, a set of parameter values comprising (i) an alphabet that includes a set of characters, (ii) a target bit width, (iii) a permutation ratio, and (iv) an initial offset value; based on a size of the alphabet, calculating, by the computing device, a maximum string length of a string created from the alphabet that is uniquely represented by a number having the target bit width; based on the size of the alphabet, the maximum string length, and the permutation ratio, calculating, by the computing device, a partition size that represents a number of unique stealthy string types that are creatable; based on the size of the alphabet, the maximum string length, and the partition size, calculating, by the computing device, a number of different possible representations for a given stealthy string type; arbitrarily selecting, by the computing device, an offset value that represents the given stealthy string type, wherein the offset value falls within a range from zero to the partition size; generating, by the computing device, a stealthy string of the given stealthy string type, by (i) selecting a random value that falls within a range from zero to the number of different possible representations for the given stealthy string type, (ii) calculating a numeric representation of the stealthy string, based on the random value, the number of different possible representation for the given stealthy string type, and the offset value, (iii) for each digit of the numeric representation of the stealthy string, using the digit as an index value to identify a corresponding character in the alphabet, and (iv) concatenating the corresponding characters.

This and other implementations can include any, all, or none of the following features. The given stealthy string type can represent a directory name, a file name, an encryption key, or a signature. The alphabet can include sixty-two alphanumeric characters, including twenty-six lower-case letters, twenty-six upper-case letters, and ten digits. The target bit width can be eight bytes. Calculating the numeric representation of the stealthy string can include: determining a product of the random value and the number of different possible representations for the given unique stealthy string type; determining an intermediate numeric representation of the stealthy string by adjusting the product by the offset value; and converting the intermediate numeric representation to a base value that corresponds to the size of the alphabet. A test string can be received from another computing device. A determination can be performed of whether the test string is of the given stealthy string type, and an indication of whether the test string is of the given stealthy string type can be output. Determining whether the test string is of the given stealthy string type can include: determining a base value representation of the test string according to a base value that corresponds to the size of the alphabet; converting the base value representation of the test string to a decimal value representation of the test string; determining a test value for the test string, by adjusting the decimal value representation of the test string by the offset value, and performing a modulus operation with the partition size; and comparing the test value for the test string to the offset value that represents the given stealthy string type.

Other implementations of these aspects include corresponding computer systems, and include corresponding apparatus and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

BRIEF DESCRIPTION OF THE DRAWINGS

The disclosure can be more completely understood in consideration of the following detailed description of various embodiments of the disclosure, in connection with the accompanying drawings, in which.

Figure 1:
FIG. 1 is a schematic of various system components that use obfuscation technology.
Figure 1:
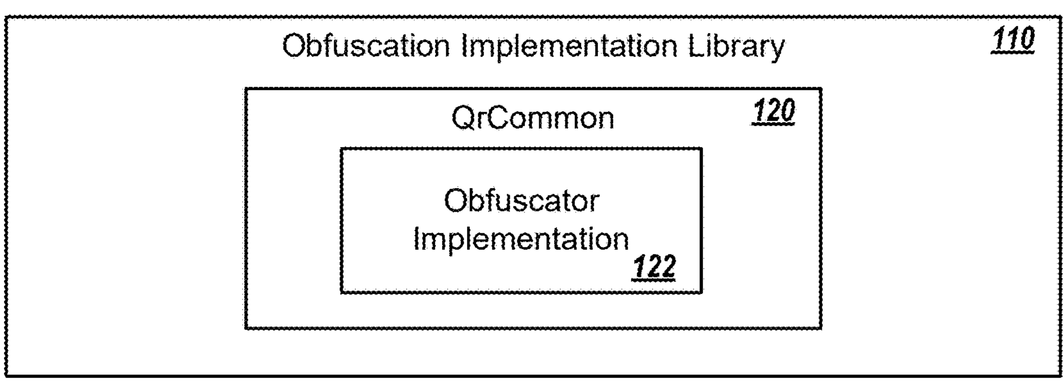
Figure 1:
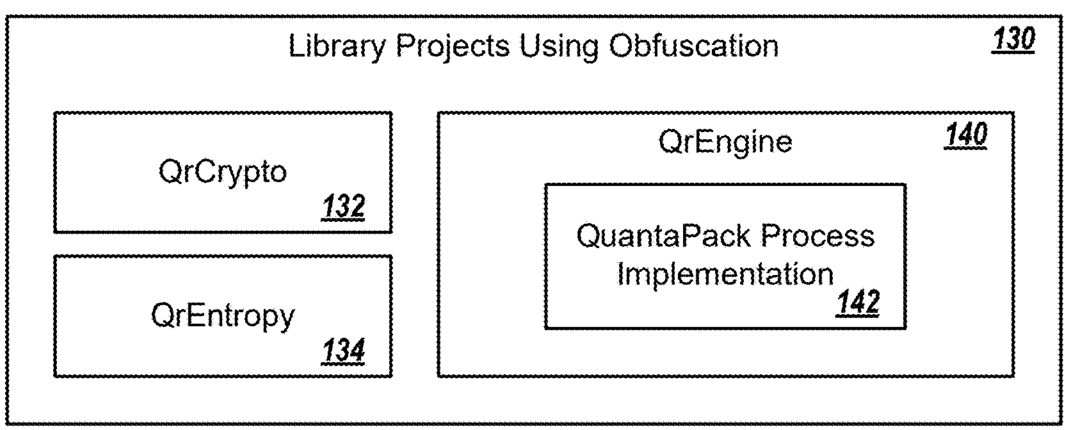
Figure 1:
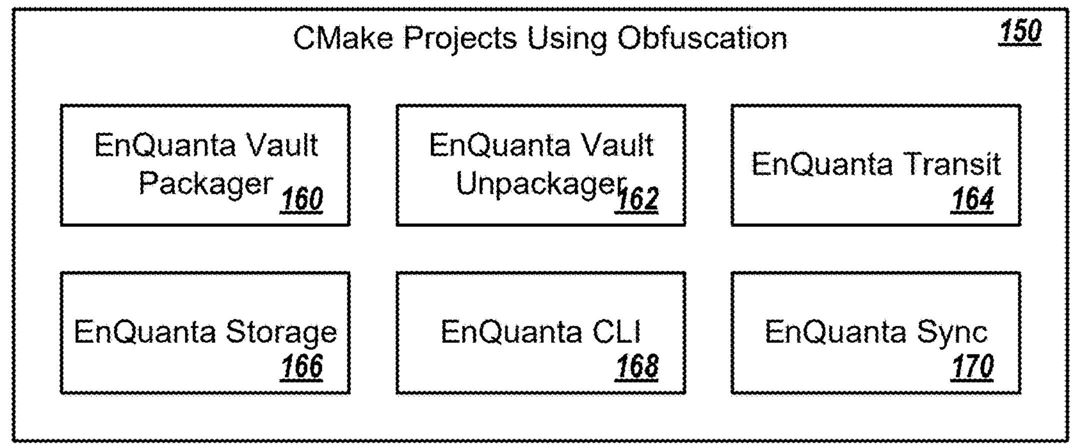

While embodiments of the disclosure are amenable to various modifications and alternative forms, specifics thereof shown by way of example in the drawings will be described in detail. It should be understood, however, that the intention is not to limit the disclosure to just the embodiments described. On the contrary, the intention is to cover all modifications, equivalents, and alternatives falling within the spirit and scope of the subject matter as defined by the claims.

DETAILED DESCRIPTION

For purposes of this specification, the following terms and acronyms are specifically defined as follows:

Amalgamated Codex refers to a collection of various information, data and/or metadata elements that are combined into a single data object. The term "amalgamated" suggests a fusion of different elements, while "codex" is a collection of information. So, an amalgamated codex refers to a unified data object that brings together diverse pieces of information, typically in a structured or organized manner. In the context of quantum cyber resilience and incryption, this data object would include incryption-related information and may be protected or encrypted.

Anti-Tampering (AT) includes engineering and human activities and capabilities that are intended to prevent or delay access to or exploitation of critical program information.

Ciphertext refers to encrypted/incrypted text/data transformed from plain text/data using a cryptographic process.

Critical Program Information (CPI) refers the cyber capabilities and elements of a device or system that contribute to technical advantage, including military advantage, of such devices or systems.

Cyber is a term that indicates relationship or relatedness to the field of computer science, including computers, information technology and virtual reality.

Cyber Resilience is the ability to anticipate, withstand, recover from, and adapt to adverse conditions, stresses, attacks, or compromises on cyber systems that use or are enabled by cyber resources.

Cybersecurity is a field of computer science focused on protecting computer and information technology networks, systems, and data from unauthorized access and cyberattacks.

Digital Assets includes data, code, databases, text, training sets and/or weighting sets for neural networks, ciphertext that is hardware and/or software encrypted data, digital content, or digitally personal identifiable information, or any electronic or optical information in the form of a file, a record, or an element as one of a set of digital assets that is at rest, in use or in transit. Digital Assets are sometimes referred to as intellectual property.

Double Ratchet Encryption is a kind of algorithm used to exchange encrypted messages based on an asymmetric secret key.

Encrypt/Decrypt/Encryption generally refers to use of a single Standard (NIST approved and/or publicly available) ciphers (ex: AES-256).

Incryption/Incrypt/Dicrypt refers to a set of computer-implemented processes, protocols and/or techniques used to construct and/or deconstruct an object of digital assets by encrypting/decrypting the digital assets as encrypted data using at least one Standard protection/encryption algorithm, and using one or more non-Standard protection/encryption ciphers and multiple invisibility/obfuscation processes, protocols, and techniques to make any intrinsic information derivable from the encrypted data that may have discernable patterns or properties effectively invisible.

Obfuscate/Deobfuscate refers to the cryptographic processes performed by the Non-standard obfuscation ciphers in the QHC Stack.

Package/Unpackage refers to the execution of the QuID/QCU Packager/Unpackager.

Protect/Restore refers to the cryptographic processes performed by the Non-standard protection ciphers in the QHC stack.

Processor is used in this disclosure to represent specific hardware computing structures and is synonymous with terms like controller and computer and should be understood to encompass not only computers having different architectures such as single/multi-processor architectures and sequential/parallel architectures as well as quantum computers, but also specialized circuits such as field-programmable gate arrays (FPGA), application specific circuits (ASIC), graphic processing units (GPU), signal processing devices and other devices.

Quantum Computer: refers to a type of advanced computational device that makes use of the principles of quantum mechanics, a fundamental theory in physics that describes the behavior of energy and material on atomic and subatomic levels. Unlike classical computers, which use bits as the basic unit of information (represented as either 0 or 1), quantum computers use quantum bits, or qubits.

Quantum Computing is a field of computer science focused on the development of computer and information technologies based on the principles of quantum theory that uses the unique properties of quantum physics to solve problems that are too complex and/or too massive for solution by classical computing.

Quantum Containment Unit (QCU) is a protected package that contains an amalgamated codex of various incryption-related information, data, and/or metadata combined in a single data object for a data asset package to be protected.

Quantum Cryptography Map (QCM) is a digital map/file/data object/structured object associated with a QuID that contains information about cryptography key, nonce, and associated information, and metadata for the set of digital assets that are protected as ciphertext in the QuID.

Quantum Cyber Resilience or Quantum Resilience are cyber resilience solutions and techniques applicable to adverse conditions, stresses, attacks, or compromises on cyber systems where the cyber resources used include quantum-computing.

Quantum Element (QE) is a single quantum incrypted piece or shard that corresponds to a fragment of a file, a record, or an element in a set of original digital assets.

Quantum Element Map (QEM) is a digital map/file/data object/structured object that contains information and associated metadata about the quantum elements (QEs) in a QuID including relationships and correlations to the original set of digital assets.

Quantum Element (QE) is a single quantum incrypted piece or shard that corresponds to a fragment of a file, a record, or an element in a set of original digital assets.

Quantum Hybrid Cipher (QHC) is a set of different protection and obfuscation ciphers applied in a random order and/or at a variable efficacy.

Quantum Incrypted Data (QuID) is an incrypted package of a set of digital assets protected as ciphertext quantum elements for a computing node in a target computing system.

Quantum Incryption is incryption that utilizes a quantum-resistant encryption algorithm and a quantum entropy source for random values.

Representational State Transfer Application Programming Interface (RESTful API) is a web service implementation that adheres to the principles of REST, a software architectural style used for creating scalable web services. RESTful APIs are used for building web services that are lightweight, maintainable, and scalable, often used for internet applications.

Software Anti-Tampering (SAT) includes anti-tampering designed or intended to prevent reverse engineering and exploitation of critical software and firmware technologies to deter technology transfer, alteration of system capability, or the development of countermeasures.

Symmetric Security Strength Bits ($S^3$) is a value used to estimate an end-to-end security strength represented in effective key length bits of security strength.

Tape Archive (TAR) command refers to the Tape Archive tool in Unix and Linux used for creating and manipulating archive files. The basic function of tar is to bundle a collection of files and directories into a single archive file (commonly known as a tarball), which can be easier to transport and store.

Transmission Control Protocol (TCP) is one of the main protocols of TCP/IP networks that enables two nodes to establish a connection and exchange streams of data.

As the field of quantum computing continues to advance at a rapid pace, the encryption standards that were once considered unbreakable and have long been endorsed by NIST may soon be vulnerable to new forms of cryptographic attack. This vulnerability presents the risk of sensitive data being exposed and/or compromised, a risk that was previously thought to be nearly impossible.

In addition to the need to shift to post-quantum cryptography (PQC) as the standard for encryption algorithms, there is a pressing need for the adoption of more advanced cryptanalytic agile processes and technologies that can keep up with the accelerating advances of CRQCs. Embodiments of the present disclosure provides a quantum resilience solution that is engineered to specifically address and neutralize the heightened threats posed to symmetric encryption by the exponentially exploding computational capabilities inherent in AI-enhanced CRQCs.

In general, obfuscation refers to the generation of data (e.g., computer code, communications, directory/file structures, encryption keys, signatures, strings, etc.) that is intentionally difficult to understand, in order to maintain privacy, to prevent tampering, and to deter reverse engineering. Obfuscation/Deobfuscation can include a variety of techniques that can be performed by computing devices executing code. Some of these techniques are listed below.

Stealthy Strings

Encodes special meaning into seemingly random strings.

Blended Strings

Merge/unmerge strings in a randomly parameterized way.

Sprinkled Strings

Distribute or "sprinkle" a key string throughout a base string in a random but deterministic way, so that given knowledge of the key, the sprinkled characters can subsequently be removed from the sprinkled base string. The motivation for sprinkling strings is 1) to corrupt cipher text and prevent undesired decryption by parties who do not know the correct sprinkle key string value, 2) detect possible data tampering by comparing the extracted sprinkle key string value to the original sprinkle key value.

Scrambled Strings

Accept two strings as input and produce a single merged output string.

XOR

Simplest version of Scrambled Strings; performs a pair-wise XOR operation between the source bytes in the two input strings.

Custom

In an embodiment of a more sophisticated version of Scrambled Strings; uses a hash-like function to combine the two strings in a deterministic way. An obfuscation function is applied to both inputs and additional logic is included to gracefully handle differently sized input strings and allow arbitrary output length.

Binary String Constants

String constants in the core code are obfuscated to int vector format at compile time via custom macro to prevent viewing the string constants in QuantaSafe binaries. Refer to the adamyaxley/Obfuscate GitHub library, which is incorporated herein by reference, for an alternative third-party implementation.

Randomized Multi-Section String Split

Splits a string into a specified number of sections, with each split point determined at random.

FIG. 1 is a schematic of various system components 100 that can use obfuscation technology (e.g., Stealthy Strings, Blended Strings, Sprinkled Strings, Scrambled Strings, XOR, Custom, Binary String Constants, Randomized Multi-Section String Split, etc.). The system components 100, for example, can include digital electronic circuitry, computer hardware, firmware, software, or combinations of them. The obfuscation technology can be implemented in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment. In the present example, the system components 100 include an obfuscation implementation library 110, various library projects 130 using obfuscation, and various CMake projects 150 using obfuscation.

The obfuscation implementation library 110 includes a QrCommon component 120 that includes an obfuscator implementation 122.

The library projects 130 using obfuscation includes a QrCrypto component 132, a QrEntropy component 134, and a QrEngine component 140.

The QrCrypto component 132 can be configured to retrieve data from QuantaSafe to generate a fingerprint.

The QrEntropy component 134 can be configured to create random names for QuantaElements (QEs).

The QrEngine component 140 can be configured to create a QuantaSafe directory and/or bundle name for QuantaPack packaging output, and to find a QuantaSafe directory and/or bundle for QuantaPack unpackaging input. Further, the QrEngine component 140 can include common functions for finding and/or creating obfuscated names (e.g., StealthyStrings names) for QuantaKey (QK) and/or QuantaSafe (QS) (e.g., key names, directory names, file names, etc.). The QrEngine component 140 includes a QuantaPack Process Implementation 140 that can perform a fragmentation cipher for linking parent elements to generated fragments.

The CMake projects 150 using obfuscation includes an EnQuanta Vault packager 160, an EnQuanta Vault unpackager 162, an EnQuanta transit component 164, an EnQuanta storage component 166, an EnQuanta command line interface (CLI) component 168, and an EnQuanta sync component 170.

The EnQuanta Vault packager 160 can be configured to create and find QuantaKey and QuantaSafe resources (e.g., via QrEngine functions), and can be used during packaging operations.

The EnQuanta Vault unpackager 162 can be configured to create and find QuantaKey and QuantaSafe resources (e.g., via QrEngine functions), and can be used during unpackaging and post-boot shuffle operations. Further, a QuantaPack binary can be named with an obfuscated name (e.g., a StealthyStrings name).

The EnQuanta transit component 164 can be configured to perform communications and transfer operations and can be used for creating and/or finding QuantaKey and QuantaSafe resources (e.g., via QrEngine functions).

The EnQuanta storage component 166 can include a RAID controller and can be used for creating and/or finding QuantaKey and QuantaSafe resources (e.g., via QrEngine functions).

The EnQuanta CLI component 168 can use obfuscation (e.g., StealthyStrings or another suitable obfuscation technique) for a password information file for EnQuanta CLI distributions, and the component can be used for creating and finding QuantaKey and QuantaSafe resources (e.g., via QrEngine functions).

The EnQuanta sync component 170 can use obfuscation (e.g., StealthyStrings or another suitable obfuscation technique) with custom parameters for directory names, data file names, metadata file names, etc.

Figure 2:
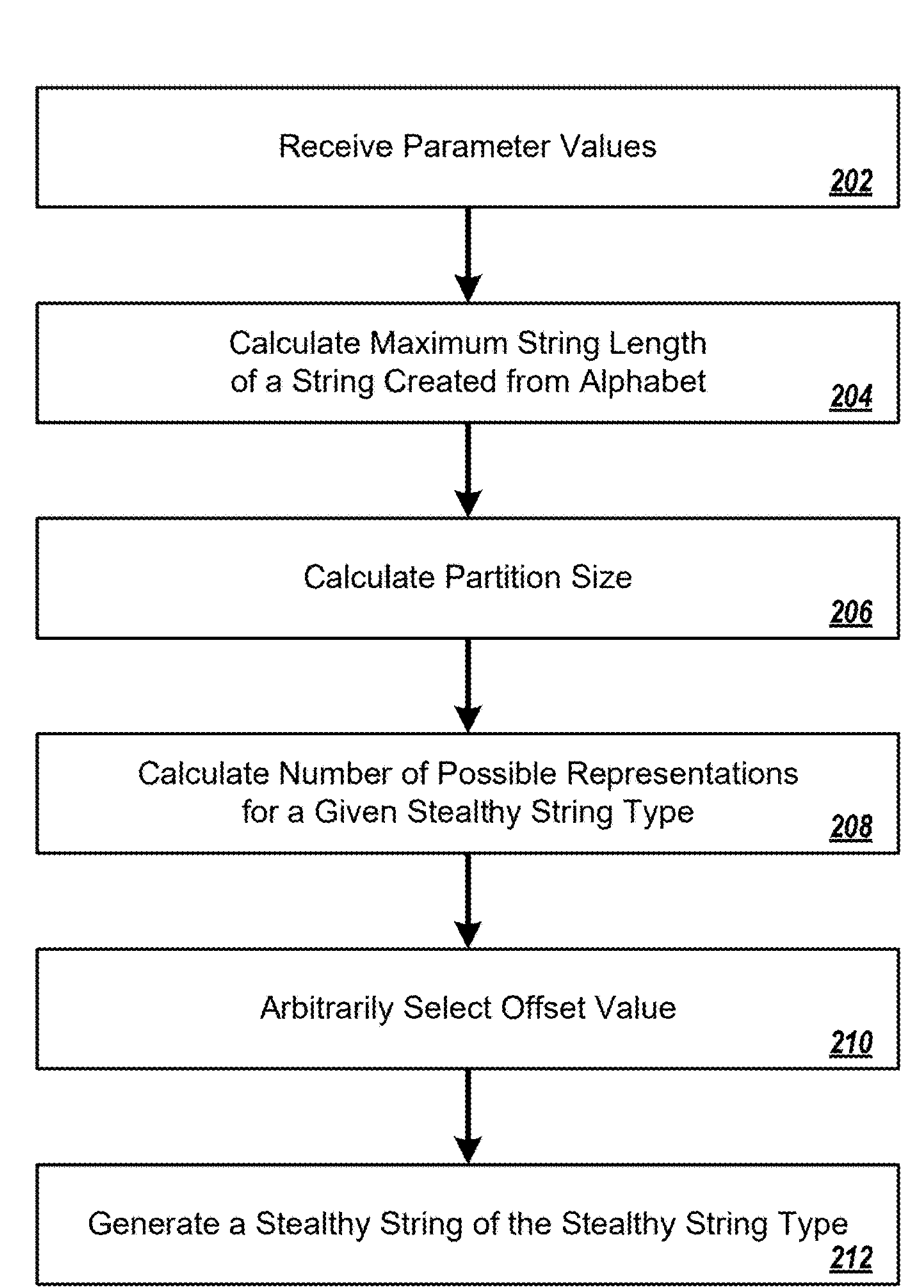
FIG. 2 shows an example process for encoding data values into random strings of data.

FIG. 2 shows an example process 200 for encoding data values into random strings of data (e.g., Stealthy Strings). The process 200 can be performed the various components 100 (shown in FIG. 1), however, other components/devices may be used to perform the same or a similar process. While operations may of the process 200 are described in a particular order, this should not be understood as requiring that such operations be performed in the particular order or in sequential order, or that all operations be performed, to achieve desirable results.

At 202, parameter values are received. For example, a computing device that implements one of the components 100 can receive a set of parameter values including an alphabet that includes a set of characters, a target bit width, a permutation ratio, and an initial offset value.

At 204, a maximum string length is calculated of a string created from an alphabet. For example, based on a size of the alphabet, the computing device can calculate a maximum string length of a string created from the alphabet that is uniquely represented by a number having the target bit width.

At 206, a partition size is calculated. For example, based on the size of the alphabet, the maximum string length, and the permutation ratio, the computing device can calculate a partition size that represents a number of unique stealthy string types that are creatable.

At 208, a number of possible representations for a given stealthy string type is calculated. For example, based on the size of the alphabet, the maximum string length, and the partition size, the computing device can calculate a number of different possible representations for a given stealthy string type.

At 210, an offset value is arbitrarily selected. For example, the computing device can arbitrarily select an offset value that represents the given stealthy string type. The offset value can fall within a range from zero to the partition size.

At 212, a stealthy string of the stealthy string type is generated. For example, the computing device can generate the stealthy string of the given stealthy string type, by selecting a random value that falls within a range from zero to the number of different possible representations for the given stealthy string type. The computing device can calculate a numeric representation of the stealthy string, based on the random value, the number of different possible representation for the given stealthy string type, and the offset value. For each digit of the numeric representation of the stealthy string, the computing device can use the digit as an index value to identify a corresponding character in the alphabet. The computing device can concatenate the corresponding characters.

The encoding of data values into random strings of data (e.g., Stealthy Strings) will now be described in further detail. In general, Stealthy Strings may be used to encode special meaning into seemingly random strings. This allows representation of special types of information as a string that can efficiently be identified, even when stored alongside other unrelated values that are formatted in the same way.

Key Features

- Allow seemingly random character sequence to be distinguishable from non-magic character sequences
- Can be assigned a type; multiple Stealthy Strings of same type are discernible within same scope
- Used to name QuID bundle file and Unpackager stub binary so they can be found in a directory with other files present
- At a high level, these magic values are computed by interpreting strings as a sequence of numbers, based on an alphabet, and then using modulo arithmetic to partition the strings into equivalence classes and calculate a remainder value (offset).
  - User defined Stealthy Strings types are associated with a fixed (pre-calculated) offset. The Stealthy Strings functionality provides the capability to:
    - Create strings that have the offset for a given Stealthy Strings type
    - Check if an arbitrary string is a member of a given Stealthy Strings type The Stealthy Strings types used for Vault are:

- QUID Directory Name
- QUID Bundle Name (unencrypted)
- QUID Archive Name (encrypted)

Mathematical Basis for Stealthy Strings

At a high-level, Stealthy Strings are based on modular arithmetic and representation of character strings as numbers.

Each Stealthy String system is parameterized (202) by 4 values:

- A: An alphabet, which is a set of characters
- W: Target bit width, which is the size of the representation. All Stealthy Strings offsets are initially constrained to the range of [0, 2^W−1)
- R: A permutation ratio, in the range (0, 1)
  - The partition size P, is derived from A, W, and R
- I: An initial offset value, chosen to be in the range of [0, P)

The calculations to set up the system, based on these parameters are:

- Let N=|A| be the size of the alphabet. Calculate (202) the largest value of X, where N^X<2^W. The value of X represents the maximum length of a string created from A that is uniquely represented by a W-bit number.
- Calculate (206) the value of floor((N^X)^R). This value will be partition size P, which represents the number of unique Stealthy Strings types that could be created.
- Next, calculate (208) Q=floor(N^X/P). Q represents the number of different representations that could generate a single Stealthy Strings type.
- To compute a given string's value, V, work from right to left and add the character value at each position, raised to the position. For example:

$V=c0+c1*N+c2*N^2 \ldots$

- The calculated offset for a string is Z=V mod P, which always lies in the range [0, P).
- To generate a value with a given offset, Z, randomly select a multiplier, M, in the range [0, Q) and then compute the characters by converting the value of (M*Q)+Z to base N and directly indexing into A using the resulting digits.

Detailed Example

Suppose it is desired to generate Stealthy Strings for a set of strings for:

- alphabet A={a, b, c, d, e}
- W=12 bits
- R=0.45 (permutation ratio)
- I=13 (arbitrary initial offset)

Initial Computations:

- N=|A|=5, which is the alphabet size
- X=5, which is the largest X, such that 5^X<2^12=4096. Note that 5^5=3125.
- Next, P=floor(3125^0.45)=37
- Finally, Q=floor(3125/37)=83
- This means that all computed Stealthy Strings values will lie in the range of [0, 3071).
  - Note—it is typically not the case that PQ=N^X, so there will usually be "leftover" values. This can be handled in 2 ways:
    - Generating values within the range [0, PQ), and disallowing the extra values as Stealthy Strings values
    - Checking the requested offset, and if it is within the proper range, choosing a random M in the range of [0, Q] instead of [0, Q).

Define Stealthy Strings Offset (210) for a Class:

- Suppose it is desired to define a class of strings that represent a single file type, using this Stealthy Strings system. First, choose an arbitrary offset in the range [0, P)=[0, 37) to represent the class. In the present case, let Z=25.

Generate a String (212) for a Given Stealthy Strings Offset:

To generate a Stealthy Strings string for this file type, first choose a random M in the range of [0, Q)=[0, 83). Suppose M=72.

Then, compute M*P+(Z+I) mod P=72*37+(25+13) mod 37=2665

Next, represent 2665 in base 5=41130. Converting this to a string gives us=>"ebbda" as a Stealthy Strings string that could be used for the file type.

Check Stealthy Strings Offset for a Given Value:

Now, suppose a given random string and it is desired to check if it is a special file type. As an example of "beadc", this corresponds to 2+3*5+0*25+4*125+1*625=1142.

(1142−13) mod P=1129 mod 37=19 !=25, so this is not a magic string for the file name type being represented.

As another example, suppose an example of"dcaec". This is represented in base 5 as 32042 and gives a decimal value of 2147. Next, (2147−13) mod P=2134 mod 37=25, which is equal to Z for the class that has been defined, so this is a valid Stealthy Strings string for the file type.

Default QuantaSafe Stealthy Strings Parameters

The alphabet, A, of 62 alphanumeric characters (lower+upper+digits)

A bit width, W, of 64 (8 bytes), which maps to an unsigned long long data type

An 8 byte integer variable can represent 18446744073709551616 distinct possible values. (1.84×10^19)

With an alphabet size of 62, X=10, so all possible 10 character strings can be mapped to one of 839299365868340224 unique values. (8.39×10^17)

A parameter ratio, R, of 0.625.

This gives P=(62^10)^0.625=159385224819 (1.59×10^11)

Likewise, Q=(62^10)/P=5265854 (5.27×10^6)

A base offset ratio of 0.3125, so I=49807882755 (4.98×10^10)

Interpreting Parameter Values

The probability of any random string being a member of a given Stealthy Strings class is approximately 1/P, which is very small. However, a guarantee is often required, so check this before generating other random values that should not be members of the class.

Likewise, the size of Q indicates how many possible magic strings there are for a given class. Based on the values above, 5.2 million unique magic strings could be generated that all represent a QuID bundle name, for example.

P and Q are inversely related, so by tweaking the offset ratio to be larger, a system can be created with a smaller probability of collisions, and fewer distinct values.

Arbitrary String Lengths

The Stealthy Strings functionality can compute a deterministic value for any given string, not just those that are the prescribed length. The rules are:

When adding values contributed by each character, the multiplication factor is adjusted to $C \times N^{A}$(Index % X), where Index is the Index within the string (measured from the end), and C is the character value within the alphabet (0-61, for example)

Do not add any contributions for characters that are not included in the alphabet A.

After every character, compute value % P, to ensure that there is no overflow of data size.

Stealthy Strings of any length, L with a specific offset Z can also be generated. This can be done by:

Randomly generating the first (L−X) characters with values from the alphabet, and no constraints.

Calculate the offset, K, of the initial set of characters. Then, adjust the target offset Z by K so that when the last X characters are generated for the string, the generated offset for the entire string will be Z.

Random magic string generation can fail if the requested length is too small for the given offset.

For example, an offset of Z=1000000 cannot be created with a requested length of 3 alphanumeric characters (N=62) because 62^3<1000000.

Figure 3:
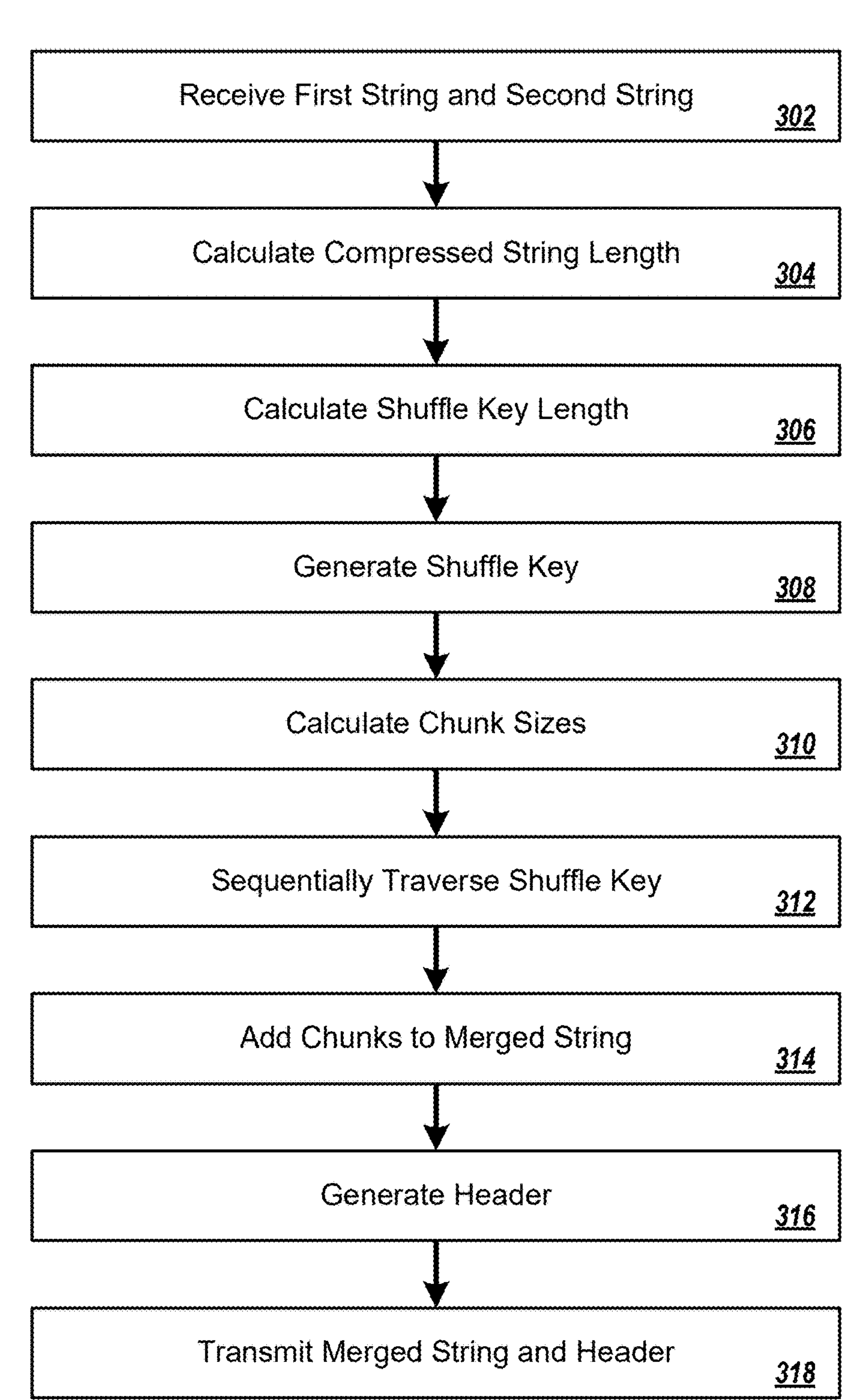
FIG. 3 shows an example process for merging strings of data in a randomly parameterized manner.

FIG. 3 shown an example process 300 for merging strings of data in a randomly parameterized manner. The process 300 can be performed the various components 100 (shown in FIG. 1), however, other components/devices may be used to perform the same or a similar process. While operations may of the process 300 are described in a particular order, this should not be understood as requiring that such operations be performed in the particular order or in sequential order, or that all operations be performed, to achieve desirable results.

At 302, a first string and a second string are received. For example, a computing device that implements one of the components 100 can receive a first string and a second string.

At 304, a compressed string length is calculated. For example, the computing device can calculate a compressed string length, based on a length of the first string, a length of the second string, or lengths of the first and second strings.

At 306, a shuffle key length is calculated. For example, the computing device can calculate the shuffle key length.

At 308, a shuffle key is generated. For example, the computing device can generate a shuffle key having a number of bytes that corresponds to the calculated shuffle key length. Generating the shuffle key can include an application of a random function. The shuffle key can be a bit pattern that includes a randomized series of zero-bits and one-bits.

At 310, chunk sizes are calculated. For example, the computing device can calculate a first chunk size for the first string, and can calculate a second chunk size for the second string.

At 312, the shuffle key is sequentially traversed. For example, the computing device can sequentially traverse the shuffle key to determine a series of shuffle key bits.

At 314, chunks are added to a merged string. For each shuffle key bit in the series of shuffle key bits, for example, in response to the shuffle key bit being a zero-bit, the computing device can add a next chunk of the first string having the first chunk size to a merged string. In response to the shuffle key bit being a one-bit, for example, the computing device can add a next chunk of the second string having the second chunk size to the merged string.

At 316, a header is generated. For example, the computing device can generate a header that includes the compressed string length, the shuffle key length, and the shuffle key.

At 318, the merged string and the header are transmitted. For example, the computing device can transmit the merged string and the header to another computing device.

The merging of strings of data in a randomly parameterized manner (e.g., Blended Strings) will now be described in further detail. In general, Blended Strings refers to a generalized functionality for merging and unmerging strings in a randomly parameterized way. The resulting parameter string can be stored separately from the combined data or together in a single combined string. In both cases, the Blended Strings can reproduce the original strings in a robust and efficient manner. Two different implementations of the Blended Strings (referred to as Implementation 1 and Implementation 2) will now be described.

Key Features (Common)

- Provides a capability for combining and separating out any arbitrary strings.
- The Blended Strings functionality returns a read-only (immutable) object that allows the consuming code to access all merge parameters and use the data as required.
- In both implementations, the Blended Strings functionality will detect if invalid data is passed and fail gracefully. Callers can check the successFlag on the returned object to validate that the operation they requested was successful.
- The Blended Strings functionality also accepts a reference to a random data function so quantum random data is used when generating the shuffle key. If this is not provided, the built-in C++ RNG based on Mersenne Twister in the <random> library can be used.
- The Blended Strings capability is well suited for a number of scenarios. A few typical use cases are:
  - To merge noise into a ciphertext string, randomly generate noise, merge it together, and then easily unmerge it to recover the original string. In this case, the original noise string is available after unmerging, but is not used.
  - The same idea as above can be used to merge in a randomly generated noise string, but improve security by storing the resulting header section separately (in the QCU). This makes the original string unrecoverable without the QCU. The noise is not stored and can be thrown away after the merge operation.
- A key point about auto merging is that it is not intended to be used as a single form of obfuscation. Although it is data agnostic, it is most useful when merging/unmerging data that is already obfuscated or can be obfuscated in a future step. Therefore it is recommended for use in conjunction with other functionality such as:
  - AES-256 encryption
  - Bitmask/Shift Cipher
  - Ring Cipher
  - Permutation Cipher Key Features (Implementation 1)

- Accepts any two strings and combines them into a single string by interleaving individual chunks from each string according to a pattern provided by a randomly generated "shuffle key".
- After merging strings, the parameters for unmerging are packed into an obfuscated format that is combined into a "header section". The interleaved string content is called the "data section".
- There are two possibilities for the unmerge operation:
  - The header section and data section can be stored separately and passed to the unmerge functionality. This is useful because the header section is the "key" for untangling the data and if it is stored separately (in the QCU for example), the combined data is not reversible without it.
  - The header section and data section are concatenated into a single string that can be automatically unmerged. The code will automatically determine where the header section ends and the data section begins.
- A key advantage of the Blended Strings approach is that the header section is highly compressed. The minimum possible size is three bytes and the maximum possible size is 2058 bytes. This size is mostly based on a user-provided parameter for controlling the shuffle complexity.
  - The shuffle complexity is a floating point parameter in the [0, 1] interval that controls the size of the shuffle key.
    - Higher Complexity=>Longer Key=>Smaller blocks/tighter interleaving.
    - Lower Complexity=>Shorter Key=>Larger blocks/looser interleaving.

Key Features (Implementation 2)

- Accepts an arbitrary vector of strings to be blended into a single obfuscated string.
- Uses a four byte entropy block for obfuscation. In the final blended string, this block is split in half, with the first two bytes being placed at the beginning of the string and the second two bytes being placed at the end.
- This version supports two different methods of obfuscation:
  - Scramble the data at the byte level according to a field based mapping, followed by an XOR operation with hash values, derived from the entropy block.
  - AES-256 encryption, using the entropy block as the key.

Details: Blended Strings (Implementation 1)

Given two strings to be combined, an additional piece of information needs to be stored to recover the original values. Even if the two strings are simply concatenated, a split point must still be known during the separation process. Blended Strings attempts to find a balance between complicated obfuscation techniques and logically simple approaches. The key idea is to generate a "shuffle key", which is a sequence of 0's and 1's. Then, this shuffle key is used to combine the strings by interleaving the source data according to the bit pattern. More specifically, a chunk of data from a first string (e.g., Source String #1) is inserted every time there is a 0 in the shuffle key and a chunk of data from a second string (e.g., Source String #2) is inserted if there is a 1.

Basic Example

Suppose it is desired to combine the strings "Quantasafe" and "123456789" (302). To merge these strings according to a bit pattern, generate a byte of data to use as the "shuffle key". In this example, suppose that the shuffle key is: 01001010 (74 in decimal).

Next, compute the respective chunk sizes (310), based on the number of bits set.

1. There are five zero bits, so take the length of the first string ("Quantasafe"), which is 10, divide by 5 and arrive at a chunk size of 2.
2. There are three one bits, so take the length of the second string ("123456789"), which is 9, divide by 3 and arrive at a chunk size of 3.

Next, build the combined string (312, 314) by interleaving chunks from the two strings. Start with the least significant bit, and move to the most significant bit, which is opposite of how it is displayed as a single byte.

This produces:

| Shuffle Key | 0 | 1 | 0 | 1 | 0 | 0 | 1 | 0 |
|---|---|---|---|---|---|---|---|---|
| Result Chunk | Qu | 123 | an | 456 | ta | sa | 789 | fe |

This returns a combined string of "Qu123an456tasa789fe".

When given this value and the associated shuffle key used to produce it, the process can easily be reversed to get the original data back.

Blended Strings Processing Details

The previous example is slightly simplified, compared to what is happening during the Blended Strings logic. This section gives additional details.

Merge Step:

Inputs:

Every merge operation uses 4 values:

Source String #1 (302)

Source String #2 (302)

Shuffle Complexity (optional—defaults to 0.5)

Random Function (optional—default provided based on Mersenne Twister)

Calculate Shuffle Key Length (306):

As above, a shuffle key is generated to interleave string #1 and string #2 in a random way. However, first the length of this shuffle key is computed in bytes. For this operation, compute floor(2048^(shuffle_complexity)). Also perform an additional check to get the recommended shuffle size by multiplying the length of the shorter input string by 2 to get an expected length in bits for representing each of the smaller string's bytes in a single chunk. Lastly, choose the smaller of these two lengths, because a shuffle key that is too long for the source data will lead to uneven interleaving.

Generate Shuffle Key (308):

Once the shuffle key length is computed, generate a shuffle key of that many bytes. Note that single bytes of 0 or 255 are not generated for this step because all shuffle keys should contain at least a single zero and a single 1.

Calculate Compressed String Length and Type (304):

As part of a parameter block, the lengths of the individual source strings should be known, and can be stored as a single number. To save space, store either a raw length or a difference of lengths. The possible options are:

Type #1: Length1

Type #2: Length1−Length2

Type #3: Length2

Type #4: Length2−Length1

Create Data Section (Merge Operation) (312, 314):

In this step, the shuffle key and interleaving of the source strings are described. This logic also accounts for uneven block sizes, size 0 strings, etc. This produces the "data section" output string, which is equal in length to the sum of the lengths of the 2 source strings.

Create Header Section (316):

The header section contains all the parameterized data needed to unpack itself and the merged string. The data stored in the header section is:

Shuffle Key Length (bytes)

Compressed String Length Type 4 possible values—see above

Compressed String Length Size (bytes)

The length value should fit inside a single uint64_t, so allow values from 0-7. A side effect of this is that the largest amount of data that can be stored is on the order of 2^56, which is sufficient to process any possible string lengths.

Compressed String Length

Actual compressed string length value (0-7 bytes)

Note that if one of the source strings is empty, or if the strings are the same length, this value is 0 and can be fully omitted from the header.

Shuffle Key Value:

Between 1 and 2048 bytes, depending on shuffle complexity and input data.

Note that the shuffle complexity parameter is not stored.

Unmerge Step:

Inputs:

There are 2 possible inputs for unmerge:

Separated header section and data section

Combined merge string containing both the header and data sections

Unpack Header Section Metadata

Based on the input, the header section was either passed separately or at the beginning of the combined string. Start by extracting fixed length data from the first 2 bytes of the header section. This data includes:

Shuffle Key Length Bytes

Compressed String Length Type

Compressed String Length Bytes

Unpack Remaining Header Section

There are two dynamically sized portions of the header section. However, given that the size of these is stored in a fixed length format read in the previous step, these values can be read now. They are:

Compressed String Length (minimum 0 bytes, up to 7 bytes, stored into uint64_t)

Shuffle Key (minimum 1 byte, up to 2048 bytes, stored as a string)

Calculate Source String Lengths

Based on the following three factors, separate out the lengths of the source strings:

Compressed Source String Length (uint64)

Compressed Source String Type (4 possible values)

Data Section Length (This is equal to Length1+Length2)

If a combined string is passed to unmerge, compute the data section length by subtracting the header section length from the combined length Extract Source Strings (Unmerge Operation):

After calculating the source string lengths, calculate the correct chunk length and extract the source strings from the interleaved data section using the shuffle key.

Blended Strings Format Details

Combined Merge String (318):

A combined merge string includes a header section and a data section that can be stored together or separately by the caller:

| Header Section | Data Section |
|---|---|
| (parameters needed to unpack strings) | (interleaved source strings) |

Header Section:

Contains 3 sections:

| Metadata | Compressed String Length | Shuffle Key |
|---|---|---|
| (fixed with-2 bytes) | (variable length: 0-7 bytes) | (variable length: 1-2048 bytes) |

Metadata:

Fixed width of 2 bytes (16 bits), packing 3 possible values:

| Shuffle Key Length | Compressed String Length Type | Compressed String Length Bytes |
|---|---|---|
| (11 bits/2048 possible values) | (2 bits/4 possible values) | (3 bits/8 possible values) |

Details: Blended Strings (Implementation 2)

Implementation 2 of the Blended Strings functionality attempts to improve the obfuscation quality by making the final output indistinguishable from random data. The process omits the use of a shuffle key and depends on a truly random entropy block instead. In the sections below, the processing steps are described, for both the XOR based option and the encryption based option.

Processing Details—XOR Option

Generate Entropy Block

Use the provided random function (may be QRNG) to generate four bytes of entropy, that will be used as the entropy block.

Build Metadata Section

For each string that is to be blended, add it to a colon delimited list that represents the length of each string in bytes.

Build Input String

Concatenate the metadata section with a single pipe character, and then the content of each input string.

Pad Input String to Prime Length

Calculate the total length of the input string and pad it with random data, so that the length is prime.

Shuffle the Padded Input String

Use the entropy block to generate a random number that is less than the prime length of the string, along with a random offset value. Use modulo multiplication under the field of size p to shuffle the source data.

XOR Shuffled Data

Once the data has been shuffled, XOR the string with 64 byte hash values, derived from the entropy block.

Create Final Blended String

Place the first 2 bytes of the entropy block before the beginning of the XOR result and the last 2 bytes after the XOR result to generate the final blended string.

Processing Details—Encryption Option

Generate Entropy Block

Use the provided random function (may be QRNG) to generate four bytes of entropy, that will be used as the entropy block.

Build Metadata Section

For each string that is to be blended, add it to a colon delimited list that represents the length of each string in bytes.

Build Input String

Concatenate the metadata section with a single pipe character, and then the content of each input string.

Encrypt Input String

Use AES-256 to encrypt the final input string, using a derived 32 byte hash as the encryption key.

Create Final Blended String

Place the first two bytes of the entropy block before the beginning of the ciphertext result and the last two bytes after the ciphertext result to generate the final blended string.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations, and locations, etc. have been described for use with disclosed embodiments, others besides those disclosed may be utilized without exceeding the scope of the claimed inventions.

Persons of ordinary skill in the relevant arts will recognize that the subject matter hereof may be composed of fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can be composed of a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A computer-implemented method for merging strings of data in a randomly parameterized manner, the method comprising:

receiving, by a computing device, a first string and a second string;

calculating, by the computing device, a compressed string length, based on a length of the first string, a length of the second string, or lengths of the first and second strings;

calculating, by the computing device, a shuffle key length;

generating, by the computing device, a shuffle key having a number of bytes that corresponds to the calculated shuffle key length, wherein generating the shuffle key comprises an application of a random function, and wherein the shuffle key is a bit pattern that comprises a randomized series of zero-bits and one-bits;

calculating, by the computing device, a first chunk size for the first string;

calculating, by the computing device, a second chunk size for the second string;

sequentially traversing the shuffle key, by the computing device, to determine a series of shuffle key bits;

for each shuffle key bit in the series of shuffle key bits, (i) in response to the shuffle key bit being a zero-bit, adding a next chunk of the first string having the first chunk size to a merged string, or (ii) in response to the shuffle key bit being a one-bit, adding a next chunk of the second string having the second chunk size to the merged string;

generating, by the computing device, a header that comprises the compressed string length, the shuffle key length, and the shuffle key; and transmitting, by the computing device to another computing device, the merged string and the header.

2. The computer-implemented method of claim 1, wherein the first string includes at least one of a directory name, a file name, an encryption key, and a signature, and wherein the second string includes randomly generated noise.

3. The computer-implemented method of claim 1, further comprising performing an obfuscation process on the first string.

4. The computer-implemented method of claim 1, further comprising performing an obfuscation process on the merged string.

5. The computer-implemented method of claim 1, wherein calculating the shuffle key length comprises:

determining, from the first string and the second string, a string having a lesser string length;

determining a lesser key length value by doubling the lesser string length; and selecting as the shuffle key length, the lesser key length value.

6. The computer-implemented method of claim 5, further comprising:

receiving, by the computing device, a shuffle complexity value, wherein calculating the shuffle key length comprises:

determining a recommended shuffle key length value by multiplying the shuffle complexity value by a predetermined shuffle size constant;

comparing the recommended shuffle key length value to the lesser key length value, and selecting as the shuffle key length, a lesser of the recommended shuffle key length value and the lesser key length value.

7. The computer-implemented method of claim 1, wherein calculating the first chunk size for the first string comprises dividing a length of the first string by a number of zero-bits in the shuffle key, and wherein calculating the second chunk size for the second string comprises dividing a length of the second string by a number of one-bits in the shuffle key.

8. The computer-implemented method of claim 1, further comprising:

concatenating, by the computing device, the merged string and the header, wherein providing the merged string and the header comprises providing the merged string and the header together.

9. The computer-implemented method of claim 1, wherein providing the merged string and the header comprises providing the merged string and the header separately.

10. The computer-implemented method of claim 1, wherein the shuffle key length and the compressed key length are stored in a fixed length portion of the header, and the shuffle key is stored in a variable length portion of the header.

11. The computer-implemented method of claim 1, further comprising:

receiving, by the another computing device, the merged string and the header; and unmerging, by the another computing device, the first string and the second string.

12. The computer-implemented method of claim 11, wherein unmerging the first string and the second string comprises:

unpacking the header to determine the compressed string length, the shuffle key length, and the shuffle key;

based on the compressed string length, calculating the length of the first string and the length of the second string;

based on the length of the first string, calculating the first chunk size for the first string;

based on the length of the second string, calculating the second chunk size for the second string; and extracting the first string and the second string from the merged string using the shuffle key.

13. A computer-implemented method for encoding data values into random strings of data, the method comprising:

receiving, by a computing device, a set of parameter values comprising (i) an alphabet that includes a set of characters, (ii) a target bit width, (iii) a permutation ratio, and (iv) an initial offset value;

based on a size of the alphabet, calculating, by the computing device, a maximum string length of a string created from the alphabet that is uniquely represented by a number having the target bit width;

based on the size of the alphabet, the maximum string length, and the permutation ratio, calculating, by the computing device, a partition size that represents a number of unique stealthy string types that are creatable;

based on the size of the alphabet, the maximum string length, and the partition size, calculating, by the computing device, a number of different possible representations for a given stealthy string type;

arbitrarily selecting, by the computing device, an offset value that represents the given stealthy string type, wherein the offset value falls within a range from zero to the partition size;

generating, by the computing device, a stealthy string of the given stealthy string type, by (i) selecting a random value that falls within a range from zero to the number of different possible representations for the given stealthy string type, (ii) calculating a numeric representation of the stealthy string, based on the random value, the number of different possible representation for the given stealthy string type, and the offset value, (iii) for each digit of the numeric representation of the stealthy string, using the digit as an index value to identify a corresponding character in the alphabet, and (iv) concatenating the corresponding characters.

14. The computer-implemented method of claim 13, wherein the given stealthy string type represents a directory name, a file name, an encryption key, or a signature.

15. The computer-implemented method of claim 13, wherein the alphabet includes sixty-two alphanumeric characters, including twenty-six lower-case letters, twenty-six upper-case letters, and ten digits.

16. The computer-implemented method of claim 13, wherein the target bit width is eight bytes.

17. The computer-implemented method of claim 13, wherein calculating the numeric representation of the stealthy string comprises:

determining a product of the random value and the number of different possible representations for the given unique stealthy string type;

determining an intermediate numeric representation of the stealthy string by adjusting the product by the offset value; and converting the intermediate numeric representation to a base value that corresponds to the size of the alphabet.

18. The computer-implemented method of claim 13, further comprising:

receiving, by the computing device and from another computing device, a test string;

determining, by the computing device, whether the test string is of the given stealthy string type; and outputting, by the computing device, an indication of whether the test string is of the given stealthy string type.

19. The computer-implemented method of claim 18, wherein determining whether the test string is of the given stealthy string type comprises:

determining a base value representation of the test string according to a base value that corresponds to the size of the alphabet;

converting the base value representation of the test string to a decimal value representation of the test string;

determining a test value for the test string, by adjusting the decimal value representation of the test string by the offset value, and performing a modulus operation with the partition size; and comparing the test value for the test string to the offset value that represents the given stealthy string type.

* * * * *